United States Patent [19]

Friesen et al.

[11] Patent Number: 5,719,356
[45] Date of Patent: Feb. 17, 1998

[54] STABLE TORQUE ARM MOUNTING FOR WEIGH SCALE

[75] Inventors: Dwaine Friesen; Terry Bergan, both of Saskatchewan, Canada

[73] Assignee: International Road Dynamics, Inc., Saskatchewan, Canada

[21] Appl. No.: 604,706

[22] Filed: Feb. 21, 1996

[30] Foreign Application Priority Data

Oct. 31, 1995 [CA] Canada ................................ 2161853

[51] Int. Cl.$^6$ ........................................ G01G 21/23
[52] U.S. Cl. ...................... 177/134; 177/263; 177/DIG. 9
[58] Field of Search ................................ 177/154, 155, 177/156, 134, 184, 187, 189, 262, 263, DIG. 9, 133

[56] References Cited

U.S. PATENT DOCUMENTS

| | | | |
|---|---|---|---|
| 3,354,973 | 11/1967 | Farquhar | 177/208 |
| 4,064,955 | 12/1977 | Dyck | 177/134 |
| 4,386,671 | 6/1983 | Dyck | 177/208 |
| 4,549,622 | 10/1985 | Leiman | 177/134 |
| 4,560,017 | 12/1985 | Hood | 177/255 |
| 4,609,062 | 9/1986 | Hale et al. | 177/256 |
| 4,744,254 | 5/1988 | Barten | 177/211 X |
| 5,174,404 | 12/1992 | Nuyts | 177/255 X |

FOREIGN PATENT DOCUMENTS 1173069  8/1984  Canada .

*Primary Examiner*—Michael L. Gellner
*Assistant Examiner*—Randy W. Gibson
*Attorney, Agent, or Firm*—Nixon & Vanderhye PC

[57] ABSTRACT

An improvement is provided in the mounting means for a weigh scale including a fixed peripheral frame base structure (the "base"), a central, movable, load-supporting platform (the "platform"), and interconnections between the platform with the base to allow limited vertical motion of the platform. The interconnecting means comprises at least four torque-transmitting tubular arms which are mounted and arranged around the perimeter of the platform, with one portion of each torque-transmitting tubular arm being supported with respect to the base, and another portion of each torque-transmitting tubular arm being supported with respect to the platform. The improved mounting includes a butterfly block at each end of each such torque-transmitting tubular arms. The butterfly block includes two parallel upper vertical guideways and two parallel lower vertical guideways. A roller pad is disposed at the bottom of each such guideway, the outer exposed face of each such roller pad having a semi-cylindrical protrusion thereon. An associated upright roller bar is disposed within each upper guideway, the bottom face thereof being planar, and resting on the semi-cylindrical protrusion of an associated roller pad, and the upper face thereof being curved and abutting the bottom face of the platform or the base, respectively. An associated upright roller bar is disposed within each lower guideway, the lower face of each roller bar being secured to the platform or to the bottom, respectively, of the base, the top face of each abutting the semi-cylindrical protrusion of an associated roller pad.

21 Claims, 4 Drawing Sheets

5,719,356

1

STABLE TORQUE ARM MOUNTING FOR WEIGH SCALE

BACKGROUND OF THE INVENTION (a) Field of the Invention

This invention relates to weigh scales. In particular, it relates to components for weigh scales and more particularly to a torque arm mounting for such weigh scales. More specifically, but not exclusively, it relates to mountings for internally-pivoted, torque-transmitting arms for weigh-in-motion scales.

(b) Description of the Prior Art

Traditionally, weigh scales have included a fixed peripheral framework, and a central movable platform, which was connected to the peripheral framework and to a load cell which could translate vertical movement of the central movable platform with respect to the peripheral framework into a measure of the weight on the platform.

Present weigh scales with single load cells, especially those for weighing vehicles in motion, required torque-transmitting arms with exceptional rigidity. This is so because the torque-transmitting arm were mounted on pads and rollers. The pivot points of the pad and roller mounting which were placed outside the torque-transmitting arms were designed to be massive and heavy. Weigh-in-motion scales requiring weight measurements of ten thousand pounds or more carried stabilizing torque-transmitting arms where the pivot points of the arms were in the range of, e.g., about seven and one-quarter inches apart. For this reason, torque arms were designed with, e.g., about six inch diameter seamless tubing, and e.g., about a three-quarter inch wall. Also, prior art weigh scales, being of welded construction, required an excessive mount of skill and judgment during assembly. The heavy torque arms, weighing as much as about one hundred and eighty-five pounds each, required extra lifting equipment during installation.

The design of such weigh scales required consideration of the response time. Factors which contribute to response time of such a weigh scale included: deflections of the load platform under loading due to lack of rigidity of the platform-supporting structure; friction in the interconnections linking the load platform and base structure, and vertical travel of the load platform for activating the load cell. Improved response time for vehicle scales was difficult to achieve since improvements in rigidity necessary for rapid response tended to result in increased friction which slowed response time.

Many proposals have been made to provide platform-supporting mechanisms which were believed to provide the required response time. These included the use of four peripheral torque-transmitting bars in conjunction with the following interconnecting mechanisms: pin and links, rack and gear, loop strap, and chain and sprocket. However, it was found that all of these would have too much friction to be suitable for weighing moving vehicles. U.S. Pat. No. 3,354,973 issued Nov. 28, 1967 to J. C. Farquhar illustrated typical mechanisms.

An improvement therein was provided by Dyck in U.S. Pat. No. 4,064,955 issued Dec. 27, 1977. That patent provided a scale for weighing vehicles in motion having a load-supporting platform, a fixed base structure, and means for interconnecting the platform with the base structure for allowing vertical motion of the platform. Such interconnection means were torque-transmitting bars arranged around the perimeter of the load-supporting platform with specifically-recited support and roller assemblies associated with each end of each torque-transmitting bar. A load-measuring device was also provided which operated with low vertical travel, the load cell being disposed between the platform and the base structure.

Another improvement therein was provided by Dyck in U.S. Pat. No. 4,386,671 issued Jun. 7, 1983. That patent provided an internally pivoted torque arm mounting device for weigh-in-motion or for static weigh scales. It included at least four internally-pivoted, torque-transmitting tubular arms arranged around the perimeter of the fixed bed for the load-supporting platform. One portion of each of the torque-transmitting tubular arms was supported with respect to a fixed peripheral frame base structure of the fixed bed, and another portion of each of the torque-transmitting tubular arms was supported in guideways with respect to a central load-supporting platform of the fixed bed. The improved mounting for the torque arm included a pair of spaced-apart, vertically-disposed inner and outer guideways extending along chords of the end of the torque-transmitting tubular arms. A horizontally-extending, hardened, wear surface intersected the guideways, to divide each inner and outer guideway into an upper and a lower guideway. Four support shoes were provided, namely an inner upper and an inner lower support shoe as well as an outer upper and an outer lower support shoe. Each such shoe, except for only one of the inner shoes, had a broad arcuate support surface and each had a narrow arcuate support surface. Each of the four shoes was disposed in an associated guideway and the narrow arcuate support surface bore against the hardened wear surface. The broad arcuate support surfaces bore against respective upper and lower wear plate portions of the central load-supporting platform and of the outer fixed frame. The broad flat support surface was secured with respect to either an upper or a lower surface of the outer fixed frame.

Yet another improvement thereover was provided by Dyck in Canadian Patent No. 1,173,069 patented Aug. 21, 1984. That patent provided a weigh scale comprising a fixed peripheral frame base structure and a central load-supporting platform. Means were included for interconnecting the platform with the peripheral frame base structure to allow limited vertical motion of the platform. The interconnecting means comprising at least three torque-transmitting tubular bars arranged around the perimeter of the load-supporting platform with one portion of each of the torque bars being supported with respect to the fixed peripheral frame base structure, and with another portion of each of such torque bars being supported with respect to the central load-supporting platform. A particularly specified load measuring device centrally supported the load supporting platform.

SUMMARY OF THE INVENTION

Aims of the Invention

While such mounting means for the torque arms were suitable, it was found that they still did not provide optimum reliability for all contemplated uses. Because of the intricate nature of the weigh scale, the heavy torque arms and the complicated nature of assembly, little could be done in the field in terms of repair and adjustment. Accordingly, it is the purpose of this invention to provide an improved torque arm and scale assembly.

One broad object, then, of this invention, is to provide improved interconnecting means between the fixed peripheral framework and the movable platform of weighing scales using a plurality of torque arms to provide optimum reliability.

Statement of Invention

This invention, therefore provides an improvement in a mounting means for a weigh scale, the weigh scale including a mounting frame, a central, movable load-supporting platform, and means for interconnecting the central, movable load-supporting platform with the mounting frame to allow limited vertical motion of the central, movable, load-supporting platform, the interconnecting means comprising at least four torque-transmitting tubular arms arranged around the perimeter of the mounting frame, with one portion of each the torque-transmitting tubular arm being supported with respect to the mounting frame, and another portion of each the torque-transmitting tubular arm being supported with respect to the central, movable, load-supporting platform. The improved mounting means for the torque-transmitting tubular arms comprises the following: A butterfly block is provided at each end of each such torque-transmitting arm, the butterfly block including four parallel, vertical guideways, each such guideway consisting of an inner upper guideway, an outer upper guideway, an inner lower guideway and an outer lower guideway. A roller pad is disposed at the bottom of each such guideway, the outer exposed face of each such roller pad having a semi-cylindrical protrusion thereon. An upright roller bar is disposed within the outer upper guideway, the bottom face thereof being planar, and resting on the semi-cylindrical protrusion of an associated roller pad, and the upper face thereof being curved and abutting the bottom face of the mounting frame. An upright roller bar is disposed within the inner upper guideway, the bottom face thereof being planar and resting on the semi-cylindrical protrusion of an associated roller pad, and the upper face being curved and abutting the bottom face of the central, movable, load-supporting platform. An upright roller bar is disposed within the outer lower guideway, the lower face thereof being secured to the bottom of the mounting frame, the top face abutting the semi-cylindrical protrusion of an associated roller pad. Finally, an upright roller bar is disposed within the inner lower guideway, the lower face thereof being secured to the bottom of the central, movable, load-supporting platform, the top face abutting the semi-cylindrical protrusion of an associated roller pad.

The invention also provides a weigh scale comprising the following combination: a mounting frame, a central movable load-supporting platform, and means for interconnecting the central, movable load-supporting platform with the mounting frame to allow limited vertical motion of the central, movable, load-supporting platform. The interconnecting means includes at least four torque-transmitting tubular arms which are arranged around the perimeter of the mounting frame, with one portion of each such torque-transmitting tubular arm being supported with respect to the mounting frame, and another portion of each torque-transmitting tubular arm being supported with respect to the central, movable, load-supporting platform. The improved mounting means for the torque-transmitting tubular arms comprises the following. A butterfly block is disposed at each end of each torque-transmitting arm, the butterfly block including four parallel, vertical guideways, each such guideway consisting of an inner, upper guideway, an outer, upper guideway, an inner, lower guideway and an outer, lower guideway. A roller pad is disposed at the bottom of each such guideway, the outer, exposed face of each such roller pad having a semi-cylindrical protrusion thereon. An upright roller bar is disposed within the outer upper guideway, the bottom face thereof being planar, and resting on the semi-cylindrical protrusion of an associated roller pad, and the upper face thereof being curved and abutting the bottom face of the mounting frame. An upright roller bar is disposed within the inner upper guideway, the bottom face thereof being planar and resting on the semi-cylindrical protrusion of an associated roller pad, and the upper face being curved and abutting the bottom face of the central, movable, load-supporting platform. An upright roller bar is disposed within the outer, lower guideway, the lower face thereof being secured to the bottom of the mounting frame, the top face abutting the semi-cylindrical protrusion of an associated roller pad. Finally, an upright roller bar is disposed within the inner lower guideway, the lower face thereof being secured to the bottom of the central, movable, load-supporting platform, the top face abutting the semi-cylindrical protrusion of an associated roller pad.

Other Features of the Invention

By one feature of the improved mounting means of this invention, each parallel vertical guideway is provided with a lower rectangular parallelepiped well, within which an associated roller pad is disposed.

By feature of the improved mounting means of this invention, the inner face of the mounting frame is provided with a rectangular parallelepiped well, within which is disposed a rectangular contact pad, the upper end of the outer upper roller bar being in rolling contact with the contact pad. The inner face of the top of the central, movable, load-supporting platform may be provided with a rectangular parallelepiped well within which is disposed a rectangular contact pad, the upper end of the outer upper roller bar being in rolling contact with the contact pad. The upper face of the bottom of the mounting frame may be provided with a rectangular parallelepiped well within which the bottom of the outer lower roller bar is disposed, such outer, lower roller bar being held therein by a threaded bolt/tapped aperture combination. The upper face of the bottom of the central, movable, load-supporting platform may be provided with a support for the inner, lower roller bar, such inner, lower roller bar being held therein by a threaded bolt/tapped aperture combination. The two inner guideways may be shorter then the two outer guideways. The inner lower roller bar may be shorter than the other three roller bars.

By another feature of the improved mounting means of this invention, the central, movable platform consists of a central, inner, upper platform and a central, inner, lower platform, and the mounting frame consists of an outer, upper, frame member, and an outer, lower, frame member.

By yet another feature of the improved mounting means of this invention, the upper outer roller box is operatively associated with the outer upper frame member, the lower outer roller bar is secured to the outer lower frame member, the upper, inner roller bar is operatively associated with the central, inner, upper platform, and the lower, inner roller bar is secured to the central, inner, lower platform. Each parallel vertical guideway may be provided with a lower rectangular parallelepiped well, within which an associated roller pad is disposed. The inner face of the mounting frame may be provided with a rectangular parallelepiped well, within which is disposed a rectangular contact pad, the upper end of the outer upper roller bar being in rolling contact with the contact pad. The inner face of the top of the central, movable, load-supporting platform may be provided with a rectangular parallelepiped well within which is disposed a rectangular contact pad, the upper end of the outer upper roller bar being in rolling contact with the contact pad. The upper face of the bottom of the mounting frame may be provided with a rectangular parallelepiped well within which the bottom of the outer, lower, roller bar is disposed, the outer, lower roller bar being held therein by a threaded bolt/tapped aperture combination. The upper face of the bottom of the central, movable, load-supporting platform may be provided with a support for the inner, lower, roller bar, such inner, lower, roller bar being held therein by a threaded bolt/tapped aperture combination. The two inner guideways may be shorter then the two outer guideways. The inner lower roller bar may be shorter then the other three roller bars.

By a feature of the weigh scale of this invention, the central, movable platform consists of a central, inner, upper platform and a central, inner, lower platform; the mounting frame consists of an outer, upper frame member, and an outer, lower frame member; the upper, outer, roller bar is operatively associated with the outer, upper frame member; the lower, outer, roller bar is secured to the outer, lower frame member; the upper, inner, roller bar is operatively associated with the central, inner, upper platform; and the lower, inner roller bar is secured to the central, inner, lower platform.

By yet another feature of the weigh scale of this invention, each parallel vertical guideway is provided with a lower rectangular parallelepiped well, within which an associated roller pad is disposed. The lower face of the outer upper frame member may be provided with a rectangular parallelepiped well, within which is disposed a rectangular contact pad, the upper end of the outer upper roller bar being in rolling contact with the contact pad. The inner face of the top of the central, movable, load-supporting platform may be provided with a rectangular parallelepiped well, within which is disposed a rectangular contact pad, the upper end of the outer upper roller bar being in rolling contact with the contact pad. The upper face of the outer lower frame member may be provided with a rectangular parallelepiped well, within which the bottom of the outer lower roller bar is disposed and the outer, lower roller bar being held therein by a threaded bolt/tapped aperture combination. The upper face of the central, inner, lower platform may be provided with a support for the inner, lower roller bar, such inner, lower roller bar being held therein by a threaded bolt/tapped aperture combination. The two inner guideways may be shorter than the two outer guideways. The inner, lower roller bar may be shorter than the other three roller bars.

BRIEF DESCRIPTION OF THE DRAWINGS

In the accompanying drawings.

DESCRIPTION OF PREFERRED EMBODIMENTS

Figure 1:
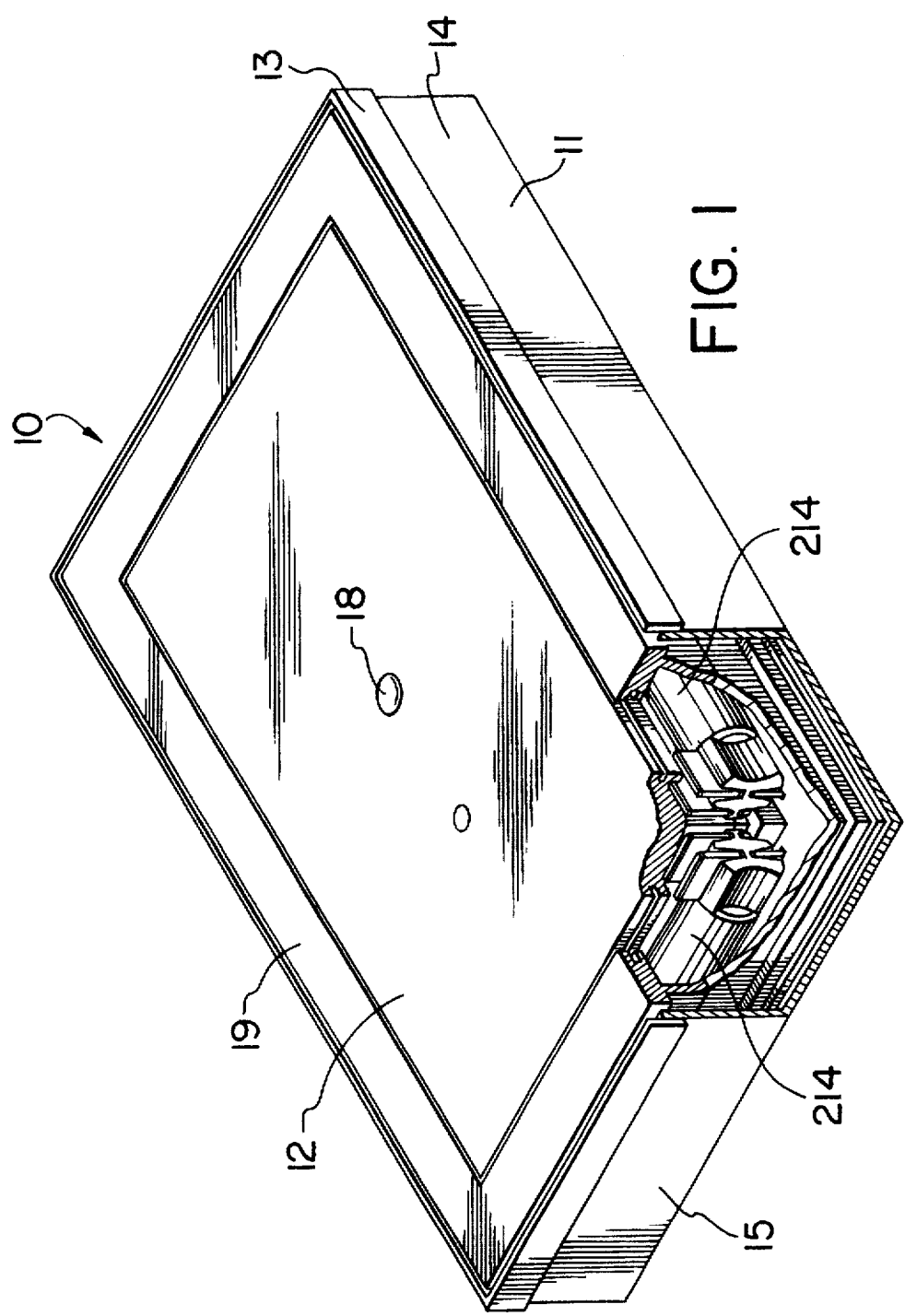
FIG. 1 is a perspective view of the weigh scale of one embodiment of the invention, showing the torque-transmitting tubular arms in position within the fixed rectangular frame, showing the central, rectangular, load-supporting platform and the central, load-measuring device, and showing one embodiment of the mounting means of the present invention for the torque-transmitting tubular arms.
Figure 2:
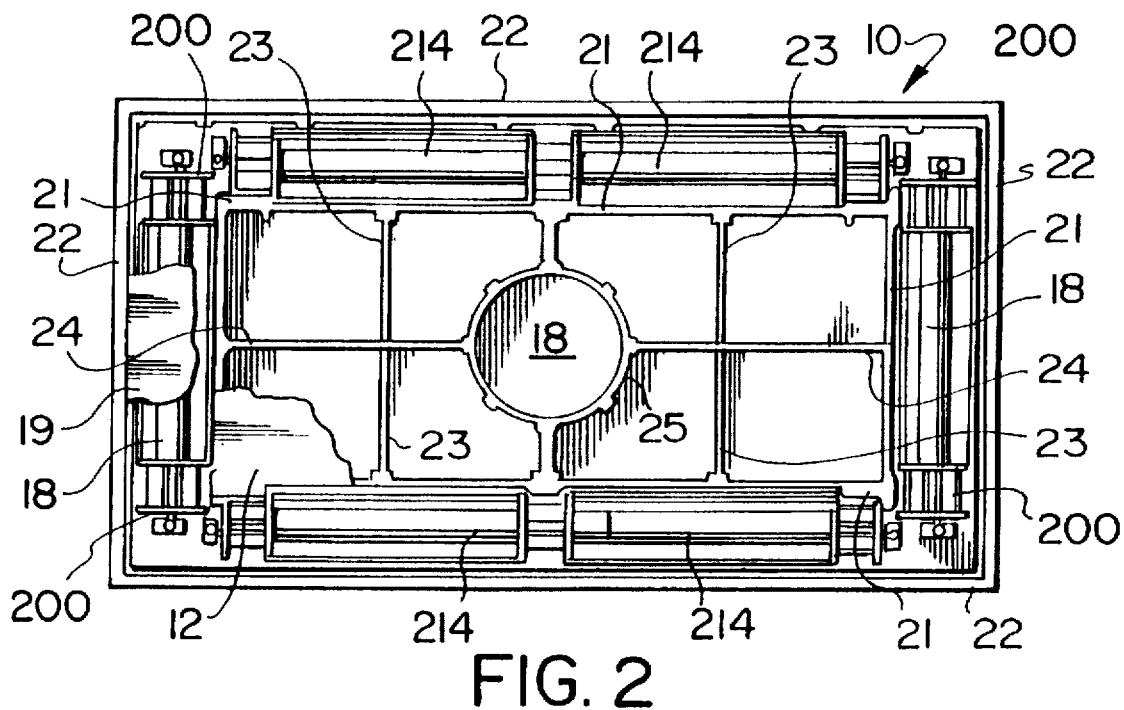
FIG. 2 is a plan view looking down on the mounting frame showing the lower, outer fixed peripheral frame with the torque-transmitting arms.
Figure 3:
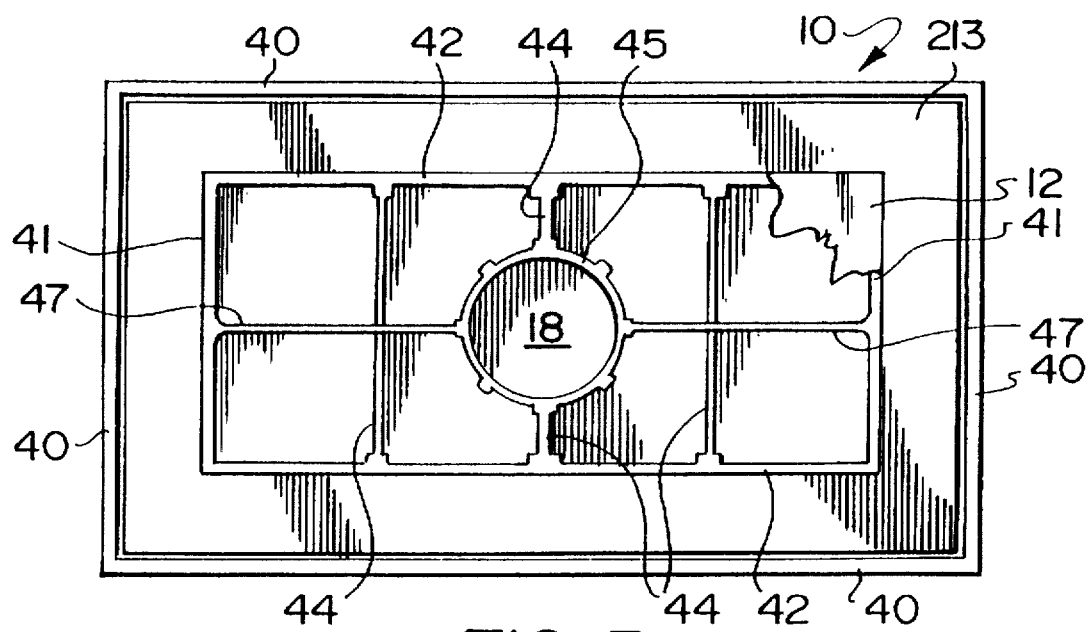
FIG. 3 is a plan view looking upwardly at the upper, outer, fixed peripheral frame and the lower, inner, central, movable load-supporting platform.

Description of FIGS. 1, 2 and 3

As seen in FIGS. 1, 2 and 3, one embodiment of this invention is a weigh scale 10 having a fixed mounting frame 11. A central, lower frame, which is an integral part of the fixed mounting frame 11, including an outer, upper, peripheral frame member 13, and an outer, lower frame member 14. Rectangular frame base 15 is an integral part of the outer, lower frame 14. A central, movable scale platform 12 is situated within the fixed mounting frame 11. It includes an inner, upper platform 16, and an inner, lower platform 17. The central, movable scale platform 12 is provided with a central, load measuring device 18. The upper, outer frame 13 and the lower, outer frame 14, along with the inner, upper platform 16 and the inner, lower platform 17, provide a nest for four torque-transmitting tubular arms 18, i.e., one at each end and one along each side of the frame 11. The upper, outer frame 13 along with its outer, upper frame cover 19 is secured to the lower outer frame 14, as by bolts (not shown). The torque-transmitting tubular arms 214 are operatively associated between the outer, upper frame member 13, the outer, lower frame member 14 and the central, movable platform, i.e., the central, inner, upper platform 16 and the central, inner, lower platform 17 by the mounting means of the present invention to be described hereinafter. The central load measuring device 18 may be any conventional load measuring cell, e.g., that disclosed and claimed in the Canadian Patent No. 1,173,069. Such cell is disposed between the central, movable platforms 16,17 and the outer frame member 13,14. A load on the central, movable platforms 16,17 transmits force in a manner now well known, and that force is translated to weight.

As seen in FIG. 2, the central, lower frame pad 12 of the lower mounting frame 11, supports the upper, outer frame member 13, and the outer, lower frame member 14. The lower, outer frame member includes a central, inner frame base 15, an outer, peripheral wall 22, longitudinal ribs 23 and transverse ribs 24, fixing a central cylindrical shell 25, within which a load measuring cell 18 is disposed.

As seen in FIG. 3, the underside of the lower mounting frame 11 is seen, as well as the underside of the central, movable platform 17. The underside of the central, movable platform 17 includes a structural framework comprising a peripheral wall 42, longitudinal ribs 43 and transverse ribs 44, fixing a central cylindrical shell 45, within which the load measuring cell 18 is disposed.

The improved mounting means 200 of one embodiment of this invention includes a butterfly block 300, which is either formed integral with, or is secured to, each end of the torque-transmitting bar 214. The butterfly block 300 is machined from a circular disc-like member which has a portion of its circumference removed to provide an inner arcuate surface 310. The diametrically-opposed arcuate face is formed into a vertical planer face 311. An upper guideway 312 and a lower guide-way 313 are provided along the diametral axis of the butterfly block 300. An upper inner chordal guideway 314 and a lower inner chordal guideway 315 are also provided adjacent the vertical planer surface 311. The base of each guideway is provided with its associated rectangular parallelepiped well 316-1, 316-2, 316-3, 316-4.

The upper face 317 of the inner floor 254 of the outer, lower, peripheral platform 250 is provided with a rectangular, parallelepiped well 318. The lower face 319 of the upper, peripheral face plate 217 of the upper, outer frame member 251 of the mounting frame 11 is provided with a rectangular, parallelepiped well 320. A countersunk bore 340 is provided in platform 250, and a countersunk bore 322 is provided in floor 254. A tapped aperture 323 is provided in the bottom end of frame member 251.

The base floor 262 of the central, lower platform 262 is provided with a countersunk bore 265 and with a supporting ledge 266, which is also provided with a countersunk bore 267. The bottom end of the central upper 218 is provided with a tapped aperture 264. The lower face 325 of the central, upper platform 218 is also provided with a rectangular parallelepiped well 326.

Figure 4:
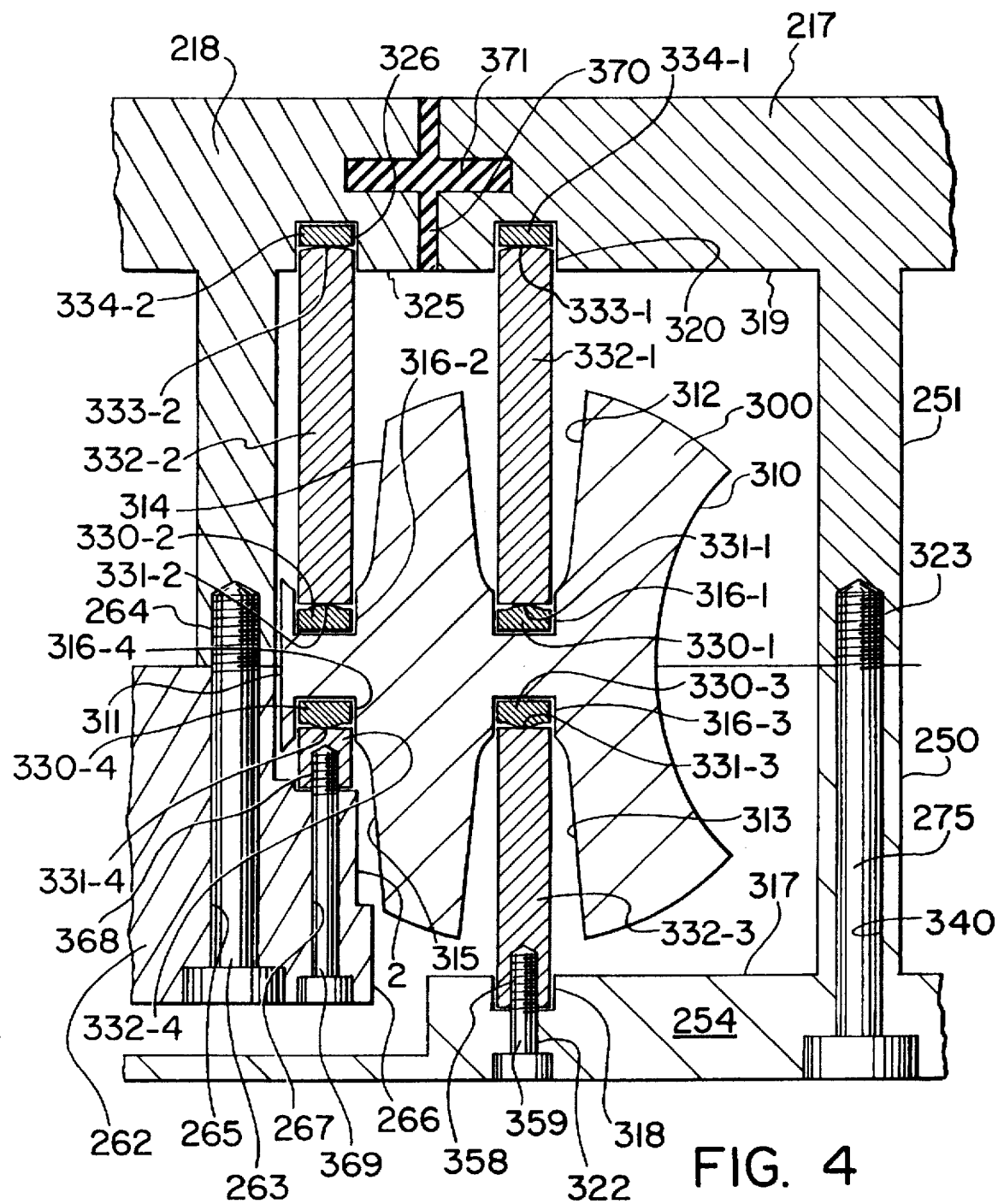
FIG. 4 is a cross-section through one corner of the embodiment of FIG. 1 showing the improved torque-transmitting arm mounting means of one embodiment of this invention.
Figure 5:
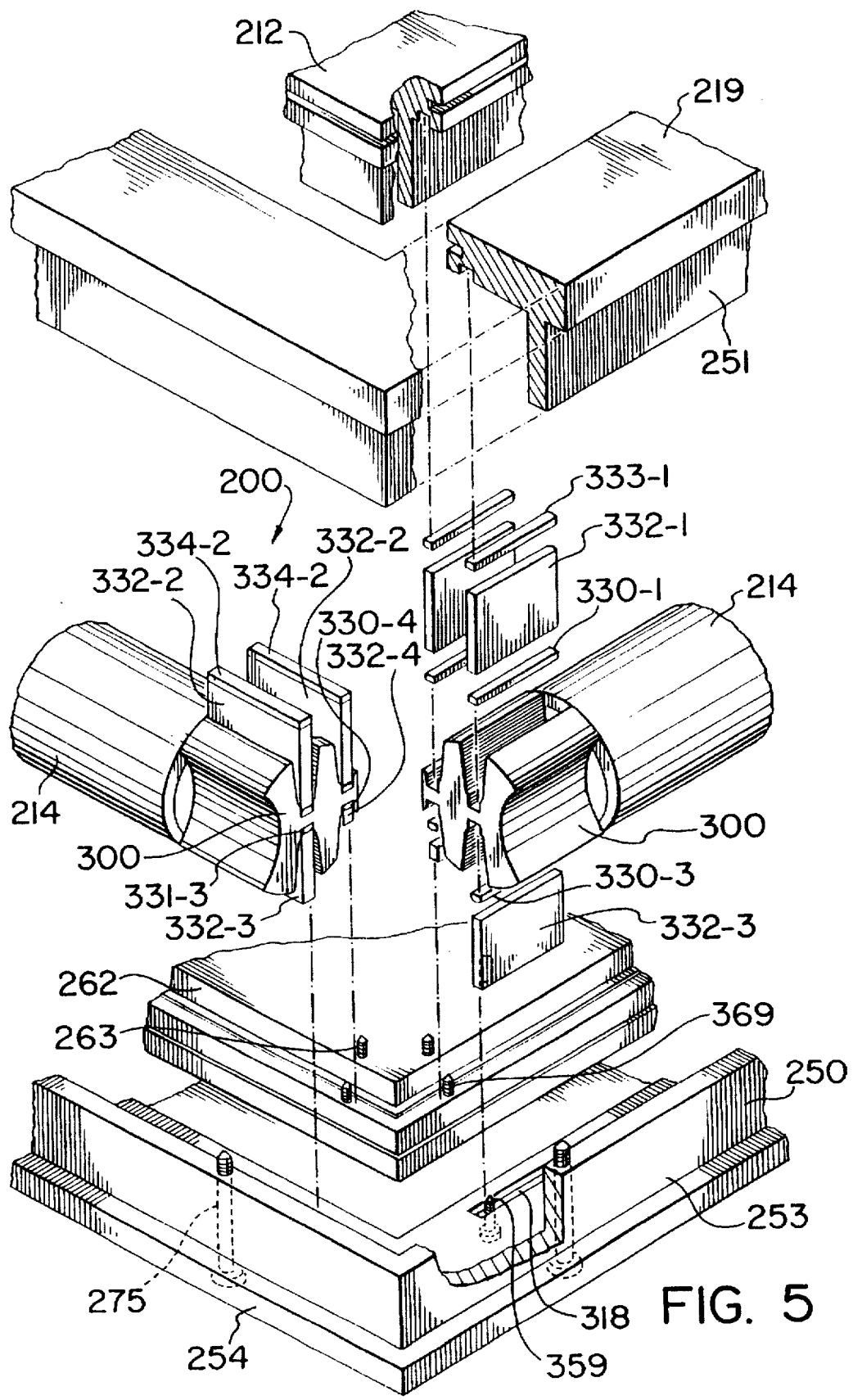
FIG. 5 is an exploded view of one corner of the weight scale of one embodiment of this invention, showing the improved torque-transmitting arm mounting means of one embodiment of this invention.

Description of FIGS. 4 and 5

The interconnection to provide rolling supported movement between the mounting frame 11 and the central, movable, load-supporting platform 12 by means of the torque-transmitting rods 14 is by the following cooperative elements.

As seen in FIGS. 4 and 5, outer upper well 316-1 is fitted with roller pad 330-1, having three planer, supported faces and a semi-cylindrical protrusion 331-1 on its exposed face. An outer, upper roller bar 332-1 rests with its planer, lower face in rolling contact with protrusion 331-1. Its upper face 333-1 is slightly curved. Such slightly curved face abuts the lower planer face of a rectangular contact bar 334-1 which is disposed in well 320 of upper, peripheral face plate 2 17.

Inner upper well 316-2 is fitted with roller pad 330-2, having three planer, supported faces and a semi-cylindrical protrusion 331-2 on its exposed face. An upper, inner roller bar 332-2 rests with its planer, lower face in rolling contact with protrusion 331-2. Its upper face 333-2 is slightly curved. Such slightly curved face 333-2 abuts the lower, flat face of a rectangular contact bar 334-2 which is disposed in well 326 of central, upper weigh pad 218.

Outer, lower well 316-3 is fitted with roller pad 330-3, having three planer, supported faces and a semi-cylindrical protrusion 331-3 on its exposed face. Outer, lower roller bar 332-3 abuts with its planer, upper face in rolling contact with protrusion 331-3. Its flat, lower face is provided with tapped aperture 358, by means of which bolt 359 secures the roller bar 332-3 to the floor 254.

Inner, lower inner well 316-4 is fitted with roller pad 330-4, having three planer, supported faces and a semi-cylindrical protrusion 331-2 on its exposed face. Inner, lower roller bar 332-i abuts with its planner, upper face in rolling contact with protrusion 331-1. Its flat, bottom face is provided with tapped aperture 368, by means of which bolt 369 secures the roller bar 332-4 to the supporting ledge 266 of floor 254.

Final securement of this weigh scale structure is provided by bolt 263 passing through bore 265 in central, lower platform 262 and into tapped aperture 264 in central weigh pad 218. Also, bolt 275 passes through bore 340 in the body 250 and into tapped aperture 323 in frame member 251.

Finally, the crack 370 between peripheral frame 217 and central upper weigh pad 218 is sealed with a peripheral rubber seal 371.

OPERATION OF THE INVENTION

In operation, downward movement of platform 218 is transmitted to roller bars 332-2, 332-4 which cause torsional rotation of torque-transmitting tubular arm 214. This torsional rotation is counteracted by roller bars 332-1, 332-3. The planer surfaces, which rest on protrusions 331-1, 331-2, 331-3 and 331-4, allow a slight rotation of the roller bars similar to the rotation of the roller supports disclosed in the above-noted Dyck U.S. Pat. No. 4,064,955. The slight, downward movement of the central platform 218 is sensed by the load measuring device and provides a signal proportional to the weight. The load cell as previously described is disposed between the weigh pad and the base structure. As previously described, a load on the weigh pad transmits force to the load cell. The force is measured by the transducer, which translates the force to weight.

The torque-transmitting tubular arms 214 may be of any cross-sectional shape, i.e., square, rectangular, oval, round, etc. However, it is preferred that the torque-transmitting tubular arms be hollow cylinders.

The arrangement of the torque-transmitting tubular arms 214 and the roller bar support assemblies of this invention, assures that the weigh pad remains horizontal with minimal deflection when a load is applied at any point on weigh pad. Because the vertical motion is supported totally on the load cell, the fixing of vertical motion of the torque tubes has no bearing on the performance of the weigh scale.

The weigh pad thus moves in a true vertical motion with high precision and rigidity. The use of the roller bars provides low friction or resistance to vertical travel of the platform, which thereby provides high sensitivity over a wide range of loads. The high degree of rigidity and low friction makes it possible to use a single centrally located load cell. At the same time, the single load cell reduces the complexity of the apparatus.

The very low vertical travel makes it possible to cover and/or to seal the weigh scale of this aspect of this invention for protection. For example, the entire structure may be enclosed, utilizing a flexible sheet material on the top surface, thereby substantially preventing contamination by dust, moisture, etc., and confining a lubricant for the pad and roller assemblies (if needed). Also, the weigh scale may be covered by a flexible road surface material, e.g., asphalt, making it possible to place the scale inconspicuously on a highway.

If it is desired to use the weigh scale of this aspect of this invention for weighing vehicles while in motion, the highway portion leading to the weigh scale should be smooth. An effective method of achieving smoothness is to resurface the highway for distance of, e.g., about 200 feet leading to the scale, over the scale itself and for, e.g., about 50 feet beyond the scale with a continuous mat of asphalt about 1 inch thick.

In operation, the vehicle to be weighed, e.g., a truck, passes over the weigh scale and applies a load force to the load cell. Any vertical change is sensed and is converted to a direct measure of weight of the vehicle.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. In a weigh scale including a mounting frame, a central, movable load-supporting platform, and means for interconnecting said central, movable load-supporting platform with said mounting frame to allow limited vertical motion of said central, movable, load-supporting platform, said interconnecting means comprising at least four torque-transmitting tubular arms arranged evenly around the perimeter of said mounting frame, with one portion of each said torque-transmitting tubular arm being supported with respect to said mounting frame, and another portion of each said torque-transmitting tubular arm being supported by with respect to said central, movable, load-supporting platform, said weigh scale including an improved mounting means for said torque-transmitting tubular arms, which comprises:

a) a butterfly block at each end of each said torque-transmitting arm, said butterfly block including four parallel, vertical guideways, each said guideway consisting of an inner, upper guideway, an outer, upper guideway, an inner, lower guideway and an outer, lower guideway;

b) a roller pad disposed at the bottom of each said guideway, the outer exposed face of each said roller pad having a semi-cylindrical protrusion thereon;

c) an upright roller bar disposed within said outer, upper guideway, the bottom face thereof being planar, and resting on said semi-cylindrical protrusion of an associated roller pad, and the upper face thereof being curved and abutting the bottom face of said mounting frame;

d) an upright roller bar within said inner, upper guideway, the bottom face thereof being planar and resting on said semi-cylindrical protrusion of an associated roller pad, and the upper face being curved and abutting the bottom face of said central, movable, load-supporting platform;

e) an upright roller bar within said outer, lower guideway, the lower face thereof being secured to the bottom of said mounting frame, the top face abutting said semi-cylindrical protrusion of an associated roller pad;

and f) an upright roller bar within said inner, lower guideway, the lower face thereof being secured to the bottom of said central, movable, load-supporting platform, the top face abutting said semi-cylindrical protrusion of an associated roller pad.

2. The improved mounting means of claim 1 wherein each said parallel vertical guideway is provided with a lower, rectangular parallelepiped well, within which an associated roller pad is disposed.

3. The improved mounting means of claim 1 wherein the inner face of said mounting frame is provided with a rectangular parallelepiped well, within which is disposed a rectangular contact pad, the upper end of said outer, upper roller bar being in rolling contact with said contact pad.

4. The improved mounting means of claim 1 wherein the inner face of the top of said central, movable, load-supporting platform is provided with a rectangular parallelepiped well within which is disposed a rectangular contact pad, the upper end of said outer, upper roller bar being in rolling contact with said contact pad.

5. The improved mounting means of claim 1 wherein the upper face of the bottom of said mounting frame is provided with a rectangular parallelepiped well within which the bottom of said outer, lower roller bar is disposed, said outer, lower roller bar being held therein by a threaded bolt/tapped aperture combination.

6. The improved mounting means of claim 1 wherein the upper face of the bottom of said central, movable, load-supporting platform is provided with a support for said inner, lower roller bar, said inner, lower roller bar being held therein by a threaded bolt/tapped aperture combination.

7. The improved mounting means of claim 1 wherein said two inner guideways are shorter then said two outer guideways.

8. The improved mounting means of claim 1 wherein said inner, lower roller bar is shorter than the other three roller bars.

9. The improved mounting means of claim 1 wherein said central, movable platform consists of a central, inner, upper platform and a central, inner, lower platform; and wherein said mounting frame consists of an outer, upper frame member, and an outer, lower frame member.

10. The improved mounting means of claim 9 wherein each said parallel vertical guideway is provided with a lower, rectangular, parallelepiped well, within which an associated roller pad is disposed.

11. The improved mounting means of claim 10 wherein the inner face of said mounting frame is provided with a rectangular, parallelepiped well, within which is disposed a rectangular contact pad, the upper end of said outer, upper roller bar being in rolling contact with said contact pad.

12. The improved mounting means of claim 10 wherein the inner face of the top of said central, movable, load-supporting platform is provided with a rectangular parallelepiped well within which is disposed a rectangular contact pad, the upper end of said outer, upper roller bar being in rolling contact with said contact pad.

13. The improved mounting means of claim 10 wherein the upper face of the bottom of said mounting frame is provided with a rectangular, parallelepiped well within which the bottom of said outer, lower roller bar is disposed and which is held therein by a threaded bolt/tapped aperture combination.

14. The improved mounting means of claim 10 wherein the upper face of the bottom of said central, movable, load-supporting platform is provided with a support for said inner, lower roller bar, which is held therein by a threaded bolt/tapped aperture combination.

15. The improved mounting means of claim 10 wherein: said upper, outer roller bar is operatively associated with said outer, upper frame member; wherein said lower, outer roller bar is secured to said outer, lower frame member; wherein said upper, inner roller bar is operatively associated with said central, inner upper platform; and wherein said lower, inner roller bar is secured to said central, inner, lower platform.

16. The improved mounting means of claim 10 wherein: said upper, outer roller bar is operatively associated with said outer, upper frame member; said lower, inner, roller bar is operatively associated with said central, inner, upper platform; said lower, inner roller bar is secured to said central, inner, lower platform; the inner face of said mounting frame is provided with a rectangular parallelepiped well, within which is disposed a rectangular contact pad, the upper end of said outer upper roller bar being in rolling contact with said contact pad; the inner face of the top of said central, movable, load-supporting platform is provided with a rectangular parallelepiped well within which is disposed a rectangular contact pad, the upper end of said outer, upper, roller bar being in rolling contact with said contact pad; the upper face of the bottom of said mounting frame is provided with a rectangular, parallelepiped well within which the bottom of said outer, lower, roller bar is disposed, said outer, lower roller bar being held therein by a threaded bolt/tapped aperture combination; the upper face of the bottom of said central, movable, load-supporting platform is provided with a support for said inner, lower roller bar, said inner, lower roller bar being held therein by a threaded bolt/tapped aperture combination.

17. The improved mounting means of claim 10 wherein said two inner guideways are shorter than said two outer guideways.

18. The improved mounting means of claim 10 wherein said inner lower roller bar is shorter than the other three roller bars.

19. A weigh scale comprising in combination:
   A) a mounting frame;
   B) a central, movable, load-supporting platform;
   and C) means for interconnecting said central, movable load-supporting platform with said mounting frame to allow limited, vertical motion of said central, movable, load-supporting platform, said interconnecting means comprising at least four torque-transmitting tubular arms arranged evenly around the perimeter of said mounting frame, with one portion of each said torque-transmitting tubular arm being supported with respect to said mounting frame, and another portion of each said torque-transmitting tubular arm being supported by with respect to said central, movable, load-supporting platform, said torque-transmitting tubular arms being mounted with respect to said mounting frame and said central, movable, load-supporting platform by improved mounting means, said improved mounting means comprising:
   a) a butterfly block at each end of each said torque-transmitting arm, said butterfly block including four parallel, vertical guideways, each said guideway consisting of an inner, upper guideway, an outer, upper guideway, an inner, lower guideway and an outer, lower guideway;
   b) a roller pad disposed at the bottom of each said guideway, the outer exposed face of each said roller pad having a semi-cylindrical protrusion thereon;
   c) an upright roller bar disposed within the outer, upper guideway, the bottom face thereof being planar, and resting on said semi-cylindrical protrusion of an associated roller pad, and the upper face thereof being curved and abutting the bottom face of said mounting frame;
   d) an upright roller bar within said inner, upper guideway, the bottom face thereof being planar and resting on said semi-cylindrical protrusion of an associated roller pad, and the upper face being curved and abutting the bottom face of said central, movable, load-supporting platform;
   e) an upright roller bar within said outer, lower guideway, the lower face thereof being secured to the bottom of said mounting frame, the top face abutting said semi-cylindrical protrusion of an associated roller pad;
   and f) an upright roller bar within said inner, lower guideway, the lower face thereof being secured to the bottom of said central, movable, load-supporting platform, the top face abutting said semi-cylindrical protrusion of an associated roller pad.

20. The improved weigh scale of claim 19 wherein: said central, movable, platform consists of a central, inner, upper platform and a central, inner, lower platform; said mounting frame consists of an outer, upper, frame member, and an outer, lower frame member; said upper, outer roller bar is operatively associated with said outer, upper frame member; said lower, outer roller bar is secured to said outer, lower frame member; said upper, inner roller bar is operatively associated with said central, inner, upper platform; and said lower, inner roller bar is secured to said central, inner, lower platform.

21. The improved weigh scale of claim 20 wherein: said upper, outer roller bar is operatively associated with said outer, upper frame member; said lower, inner, roller bar is operatively associated with said central, inner, upper platform; said lower, inner roller bar is secured to said central, inner, lower platform; the inner face of said mounting frame is provided with a rectangular parallelepiped well, within which is disposed a rectangular contact pad, the upper end of said outer upper roller bar being in rolling contact with said contact pad; the inner face of the top of said central, movable, load-supporting platform is provided with a rectangular parallelepiped well within which is disposed a rectangular contact pad, the upper end of said outer, upper, roller bar being in rolling contact with said contact pad; the upper face of the bottom of said mounting frame is provided with a rectangular, parallelepiped well within which the bottom of said outer, lower, roller bar is disposed, said outer, lower roller bar being held therein by a threaded bolt/tapped aperture combination; the upper face of the bottom of said central, movable, load-supporting platform is provided with a support for said inner, lower roller bar, said inner, lower roller bar being held therein by a threaded bolt/tapped aperture combination; said two inner guideways are shorter than said two outer guideways; and said inner, lower roller bar is shorter than the other three roller bars.

* * * * *